March 22, 1955     T. E. McINTYRE     2,704,524
DISC SEEDER
Filed Sept. 24, 1951     3 Sheets-Sheet 2
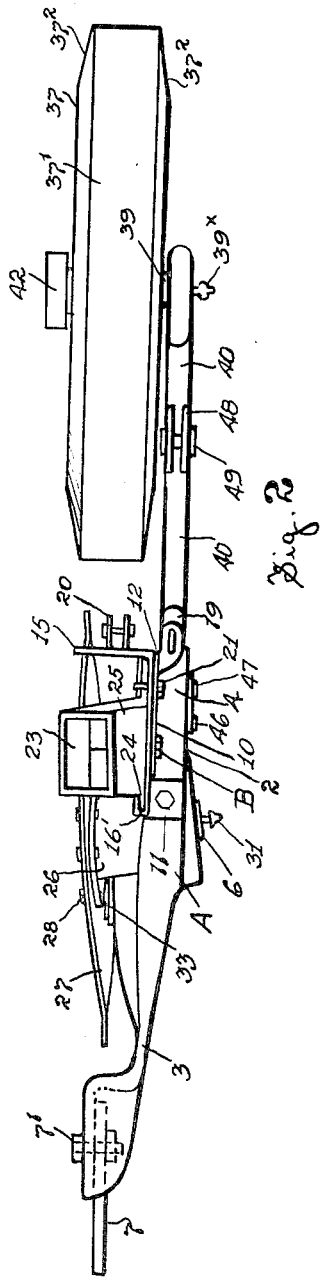
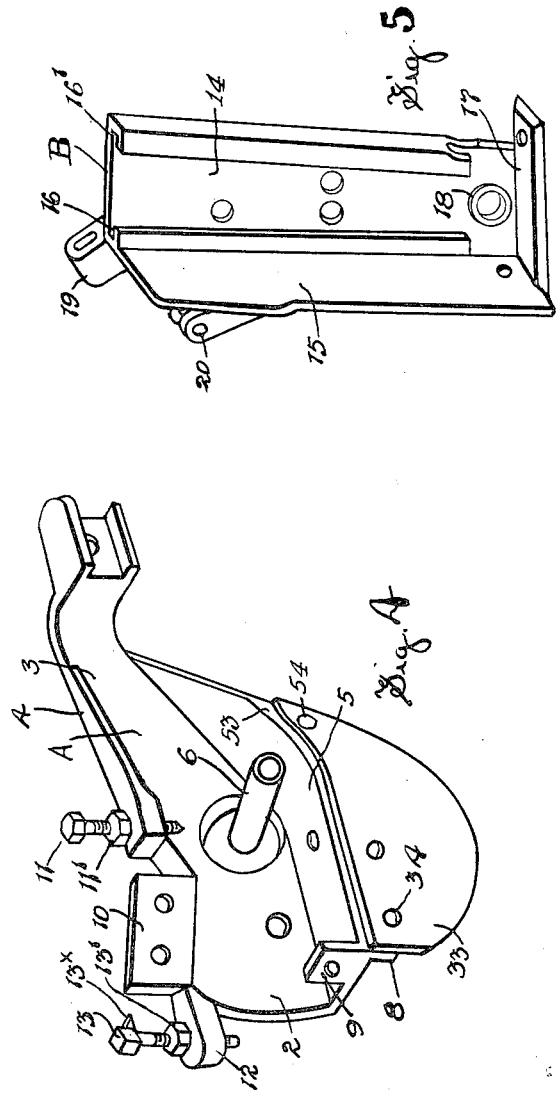

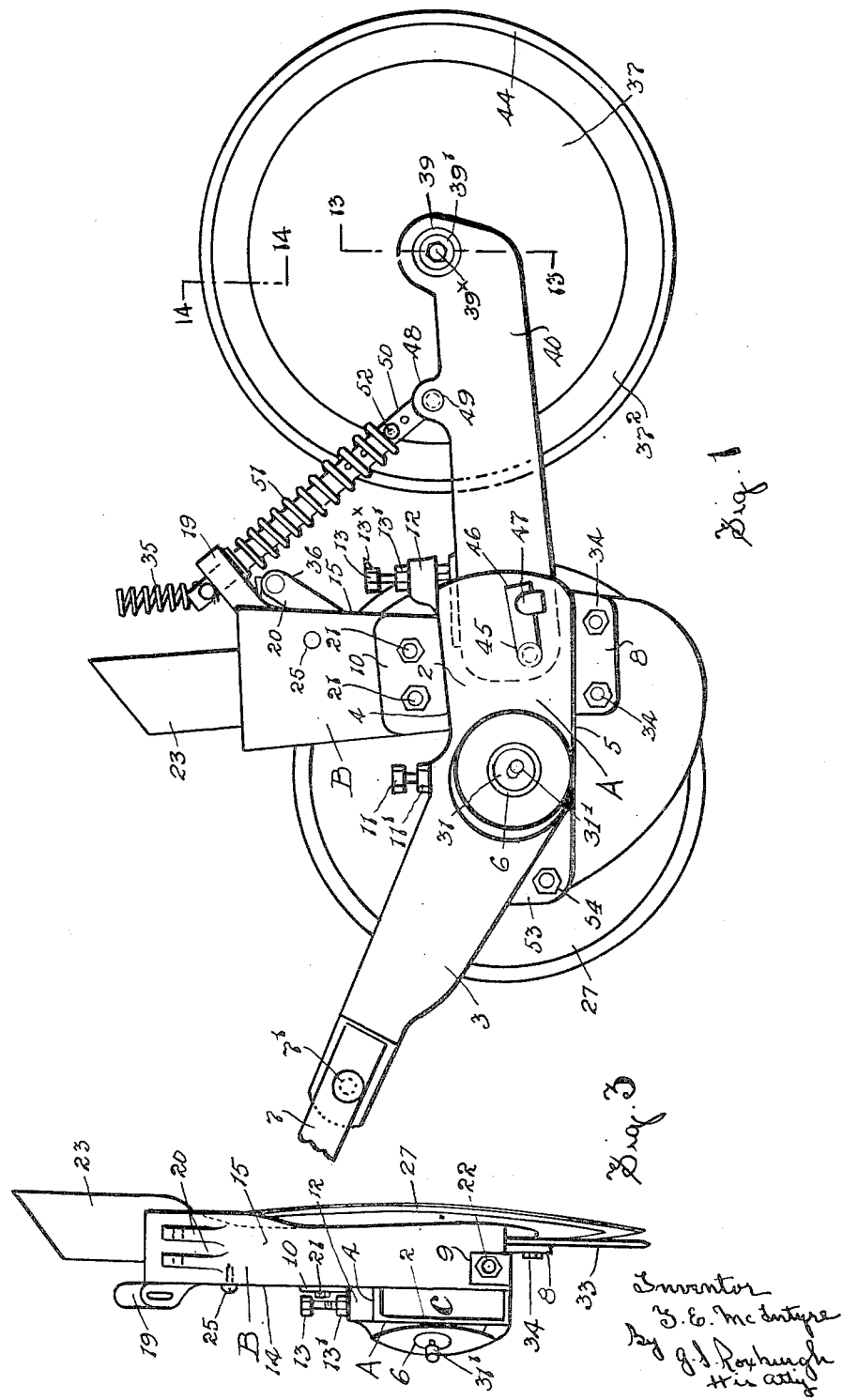

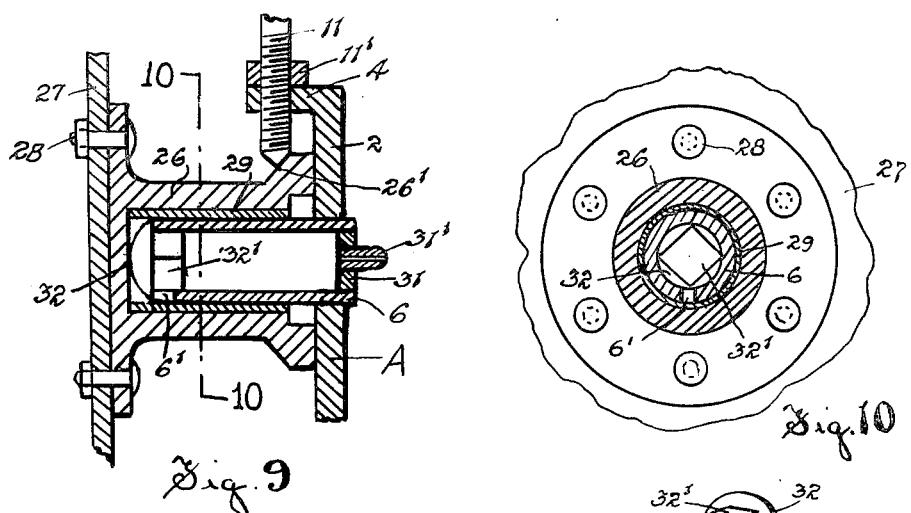
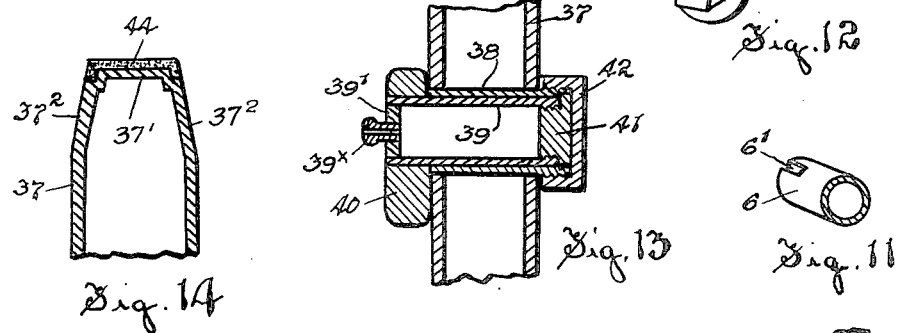
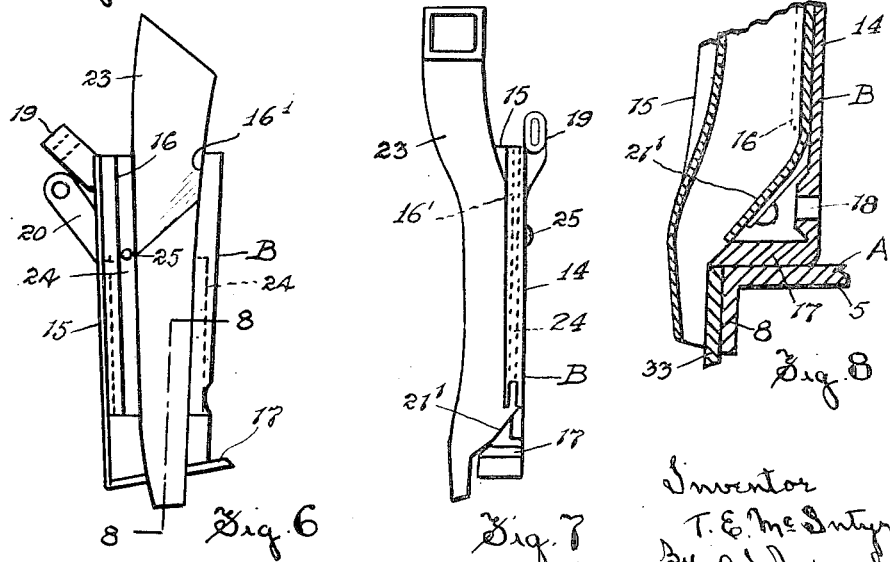

United States Patent Office 2,704,524
Patented Mar. 22, 1955

2,704,524

DISC SEEDER

Thomas E. McIntyre, Winnipeg, Manitoba, Canada

Application September 24, 1951, Serial No. 247,918

1 Claim. (Cl. 111—87)

The invention relates to a seeding unit and associated packer and depth gauge wheel assembly and which embodies a disc so positioned that the convex side of the disc opens a furrow for the seed to be sown and the trailing packer wheel packs the soil and controls the depth at which the seed can be sown in the furrow.

I am aware that seeding machines employing single and double co-acting disc for opening a trench or furrow have long been in use and it is with the object of overcoming their disadvantages that I have conceived the invention forming the subject matter of this application.

In the standard type of single disc seeding machine, the disc is dished and is set at such an angle to the line of draft that the concaved side of the disc opens the furrow or trench in which the seed is sown, with the result that in the advancement of the disc, the soil is thrown up and over to one side by the up-moving rear part of the disc and this loosens the soil unnecessarily and such action is exaggerated with increased speed of travel. In the standard double disc type of seeding machine, the discs are flat faced and converge forwardly and serve to cut a V-shaped furrow in which the seed is sown and some of the seed is permitted by the existing structure, to contact the revolving disc and is consequently not sewn in the base of the formed furrow. Further with the double disc type, if the speed of travel at three miles an hour, for which the device is designed to operate effectively, is materially increased, and which is common practice with modern farm equipment, the result is that the soil is pitched away from the furrow and is virtually broadcasted.

My invention has been designed primarily to provide a single disc seeding unit which will form a desirable furrow without throwing the soil away from the furrow at the higher speeds of travel and which does not permit the seed gravitating to the furrow to contact the revolving disc and further to associate with the seeding unit, a trailing, earth packing wheel with associated parts, which can be set in relation to the unit to permit of the selective control of the depth of the furrow made by the disc, operates to guard the disc against damage should a ground obstruction be encountered and which is so designed that it has a minimum tendency to pick up dust and dirt to be blown about by the wind.

Further features of the invention reside in structural details later apparent and which provide for the easy assembly or dismounting of the various parts, the effective oiling of moving parts, the easy and quick control of the depth of cut of the furrow, the selective and effective application of pressure to the trailing wheel, the simple, effective absorption of disc thrust and other less important features which will become apparent as the description proceeds.

I will now refer to the accompanying drawings in which:

Fig. 1 is a side view of the seeding unit and the packer wheel assembly.

Fig. 2 is a plan view of the parts shown in Fig. 1, the packer wheel spring assembly having been removed.

Fig. 3 is a rear view of the seeder unit, the packer wheel assembly having been removed.

Fig. 4 is a perspective view of the main frame of the seeder unit.

Fig. 5 is a perspective view of the leg of the unit.

Fig. 6 is a face view of the seed tube and associated supporting leg.

Fig. 7 is a side view of the parts appearing in Fig. 6.

Fig. 8 is an enlarged detailed vertical sectional view at 8—8 Fig. 6.

Fig. 9 is an enlarged detailed vertical sectional view, centrally through the disc hub and associated parts.

Fig. 10 is a cross sectional view at 10—10 Fig. 9.

Fig. 11 is a perspective view of one end of the disc carrying axle and showing the escape slot for oil.

Fig. 12 is a perspective view of the thrust bearing for the disc.

Fig. 13 is an enlarged detailed vertical sectional view at 13—13 Fig. 1.

Fig. 14 is a cross sectional view at 14—14 Fig. 1.

In the drawings like characters of reference indicate corresponding parts in the several figures.

It is primarily to be understood that a plurality of my seeding units and packer wheels are to be attached, in right and left hand groups, to the rear part of the conventional seeding machine frame and with each unit drawn by the conventional draw bar, indicated by the reference number 7.

The seeding unit which I have devised is now described in detail. The main frame or body member A of the unit is best shown in Fig. 4 and it presents a vertical plate or side wall 2 provided with a forwardly extending neck 3, a reinforcing top flange 4, a reinforcing lower flange 5 wider than flange 4 and a hollow cylindrical axle 6 permanently carried by the side wall. The forward end of the neck is shaped to receive and retain the rear end of the draw bar 7 to which it is securely fastened by a bolt 7' provided. The lower flange is supplied with a down turned side lug 8 and with an adjacent upstanding lug 9. The top flange is provided, rearwardly, with an upstanding lug 10 in advance of which is a set screw 11 carried by the said flange 4. The set screw is positioned radial to the inner end of the axle and is supplied with a lock nut 11' and has its lower or inner end tapered to a point as shown. The upper rear corner of the body member carries an extending ear 12 which is provided with a vertically disposed adjusting screw 13 fitted with a lock nut 13'.

Associated with the body member A of the unit, I supply what I herein term a leg indicated generally by the letter B and which is best shown in Fig. 5. The leg presents an upstanding, downwardly tapering guide plate 14, a relatively wide, rear vertical flange 15, downwardly tapering, opposing guide channels 16 and 16', a base plate 17, a lower bearing 18, a guide sleeve 19 and a pair of lugs 20 carried by the upper part of the flange 15. In the assembled position the leg has the plate 14 bearing against the lug 10 and the base plate thereof resting on the flange 5, and it is detachably secured in place by a pair of bolts 21 passing through the plate 14 and the lug 10 of the body A, and by a bolt 22 (see Fig. 3) passing through the lower flange 15 and the lug 9. The base plate 17 is also bolted to the flange 5.

The leg B is utilized to receive and support a seed tube 23 of the shape best shown in Figs. 6, 7 and 8. The seed tube is of variable rectangular cross section, diminishing downwardly, and it is supplied with similar side flanges 24 adapted to slide downwardly within the channels 16 and 16' until it contacts the base plate 17 as clearly shown in Fig. 18.

The upper end of the seed tube rises considerably above the leg and its lower end is offset, contracted and shaped as best shown in Figs. 6, 7 and 8, the arrangement being such that the seed gravitating through the tube is deflected first across the tube by the inner deflecting part 27' of the tube (see Fig. 5) and then back and downwardly at the inner side of a vertical shoe later referred to. To prevent the seed tube from rising, I have provided a lock screw 25 carried by the leg and which has its inner end overlying the upper end of one of the flanges, 24.

The hollow axle 6, already referred to, receives and rotatably supports the hub 26 (see Figs. 9 and 10), of a concavo-convex disc 27, one end of the hub being supplied with a suitable bushing 29 and has the end next the disc permanently closed by a bearing plate 30 integrally formed with the hub. The end of the hub remote from the disc terminates adjacent the side wall 2 of the body A and is provided, exteriorly, with a sloping shoulder 26' which is adapted to be engaged by the tapered inner end of the screw 11, the set screw serving effectively to retain the hub from withdrawing and allowing of ready removal of the hub and attached disc. It will be observed that the axle extends through the wall 2 and that the projected end is closed by a plug 31 which carries a conventional nipple 31' through which lubricating oil can be forced into the open centre of the axle by a suitable pump. The inner end of the axle stops short of the bearing plate 30 and receives the squared shank 32' of a smooth faced, curved thrust bearing 32 which engages the plate 30. This arrangement is such that all working pressure on the outer or convex side of the disc is absorbed by the bearing 32. The underside of the axle is supplied with an end under slot 6' which underlies the shank 32' and oil is accordingly free to escape from the interior of the axle to lubricate all moving parts.

In a location directly opposite the lower part of the disc, I have supplied a vertically disposed shoe 33 which is of the general shape best shown in Figs. 1 and 4 and which has its upper edge secured by bolts 34 to the lug 8 (see Fig. 1) and by a bolt 54 to a downwardly turned lug 53 carried by the forward end of the flange 5. Here it will be observed, that the lower contracted end of the seed tube is so formed that the gravitating seed is first deflected in one direction and then the other, so that it is discharged from the tube to fall immediately adjacent the inner face of the shoe and definitely clear from the revolving disc and such insures that no seed will be carried up with or by the disc.

When the seeding units are connected through the draw bars with the frame of the conventional seeding machine in the usual way, down pressure is exerted on each unit by the customary pressure spring employed as part of the seeding machine structure and seed is fed into the seed tubes in the usual manner. One of such pressure springs is shown in Fig. 1 and such spring 35 applies a down pressure on the unit through a bolt 36 carried by the lugs 20.

Associated with each seeding unit I have provided what I term a furrow, depth gauge, packer wheel 37 which has a contracted rim 37' with sloping sides $37^2$ adjacent the rim, the side walls being vertical. The hub 38 of the wheel is rotatably mounted on a hollow axle 39 which has one end closed by a plug 39' and is permanently carried by a forwardly extending arm 40. The other end of the axle is internally threaded to receive a screw threaded closure plug 41. A dust cap 42 is supplied and this is screw threaded on the projected end of the hub and enclosed the latter plug. The plug 39' is provided with a nipple $39^x$ to permit oil to be injected by a pump into the axle and the axle is supplied in its underside with a slot 43 to liberate oil to lubricate the moving parts.

It may be desirable to provide the rim of the wheel with a rubber band to prevent undue clinging of dirt to the wheel. Such a band is indicated by the numeral 44 shown best in Figs. 1 and 14.

The forward end of the arm 40 is freely received in the open area reserved at C (see Fig. 3) and appearing between the wall 2 and the opposing face of the leg, and the arm is pivotally mounted on a pivot pin 45 carried by the said wall and the bearing 18 of the leg. I desire that the pin be readily removable to permit of the ready removal of the wheel and arm and to this end I have provided the near end of the pin with a latch 46 which can be turned to engage behind a catch 47 carried by the wall.

It will be observed here that the adjusting screw 13 overlies the arm 40 to the rear of its pivot point and can, by adjustment, control the distance which the arm can upswing and by so doing control the up position of the wheel.

The arm is supplied with a pair of lugs 48 carrying a bolt 49 which passes through the lower end of an angularly disposed bar 50 which has its upper end slidably received in guide sleeve 19. A coiled spring 51 encircles the bar and has its upper end engaging the under side of the latter sleeve and its lower end engaging a pin 52 or the like adjustably carried by the bar. The down pressure of the spring can be adjusted by varying the position of the pin 52 and the spring is chosen such that it is weaker than the existing spring 35 of the seeding machine.

When the parts have been assembled and reference is made to Fig. 1 of the drawings, the lowermost point of the disc is in the vertical plane containing the line of draft, the uppermost point of the disc is canted away from the observer and the leading edge of the disc is inswung towards the observer.

To make the above clear, let it be assumed that a 13 inch diameter disc is initially placed in the vertical plane containing the line of draft and with the concave side facing the observer. To position the disc in an operating position one cants the disc by shifting its uppermost point five-eighths of an inch away from the observer and then swings the leading edge of the disc towards the observer a distance of one half an inch. This having been done, the axis around which the disc rotates has been established and the width of the furrow which the disc will form, when operating in the soil, has been determined and ample clearance space has been provided for the admission of the vertically disposed seed tube.

When my device is operating in the field the leading convex side of the disc presses the soil to the side to form the furrow, which side it will be noted is turning downwardly towards the ground, and the functions of the shoe are to prevent the soil, at the side of the furrow remote from the disc, from falling back into the furrow before the seed gravitating adjacent the inner face of the shoe and entirely free of the disc, has been sown at full depth in the furrow and to exclude soil entering between the shoe and disc and in regard to the latter function it is remarked that the forward portion of the shoe enters the concavity of the concave side of the disc and is curved to the contour of the said concave side.

It will be noted that the depth of the furrow or trench formed by the disc can be varied so that the seed can be sown at any desired depth. This is made possible by adjusting the screw 13 which if turned in an anti-clockwise direction, will allow the disc and shoe to move down, under the pressure of the spring 35, to a lower position relative to the ground level surface and in so doing increase the depth of the furrow formed by the disc. A reverse turning of the said screw will obviously decrease the depth of the formed furrow. In order to permit of accurate adjustment of the screw it is supplied with a pointer $13^x$ which allows the one making an adjustment to keep track of the number of turns or fractions thereof. It will be seen that the disc cannot move down further than as allowed by the screw adjustment, as the wheel is riding the ground surface and the forward end of the draw bar is pivotally attached to the seeding machine frame.

A further feature is that should the disc engage a ground obstruction it is not liable to be damaged as the contacting of the obstruction raises the screw 13 and then the compressed spring 51 instantly operates to reduce the effective down pressure on the unit of the spring 35 and in this connection it is to be noted that the compression of the spring 51 can be varied by adjusting the pin 52.

If it be desired to use the seeding unit without the packer wheel, the latter can be easily and quickly removed by raising the latch from the catch and withdrawing the pin 45 and bolt 49.

The construction of the various parts of the seeding unit permits of the quick assembly or dismounting of the parts, in relation one to the other, as it will be seen that the release of the pin 25 allows the seed tube to be withdrawn, the undoing of the several bolts permits the leg to be dismounted from the main frame, the release of the screw frees the hub and associated disc to be removed from the axle 6 and the undoing of the fastening bolts frees the shoe.

The embodiments of the invention in which an exclusive property or privilege is claimed are defined as follows:

In a seeding unit, in combination, a support mounted for movement along a line of draft, a concavo-convex disc mounted on said support for rotation about an axis a portion of which slopes forwardly and downwardly from a horizontal line perpendicular to a vertical plane passing through said line of draft with the lowermost point of said disc being in said plane and the major portion of said disc being to one side of said plane, the convex side of said disc facing away from said plane, whereby the upper and rear portions of said disc are canted away from said one side of said plane and the leading edge of the disc is inswung and the lower portion of said convex side engages the ground to form a furrow, a generally vertical plate-like shoe fixed to said support and disposed between said plane and the concave side of said disc, said shoe having a forward portion disposed within the concavity of the concave side, said forward portion being curved to the contour of the concave side and cooperating therewith to exclude soil entering between the shoe and disc, and a seed tube carried by said support and disposed between said shoe and disc.

References Cited in the file of this patent

UNITED STATES PATENTS

| Number | Name | Date |
|---|---|---|
| 340,190 | Beebe | Apr. 20, 1886 |
| 425,956 | Phelps | Apr. 15, 1890 |
| 486,343 | Kirkpatrick | Nov. 15, 1892 |
| 518,669 | Green | Apr. 24, 1894 |
| 526,436 | Campbell | Sept. 25, 1894 |
| 685,941 | Peterson | Nov. 5, 1901 |
| 783,395 | Ashurst | Feb. 21, 1905 |
| 822,617 | Lohr | June 5, 1906 |
| 903,235 | Schutt | Nov. 10, 1908 |
| 1,104,725 | Aspinwall | July 21, 1914 |
| 1,230,308 | Lorf | June 19, 1917 |
| 1,383,957 | Lewis | July 5, 1921 |
| 1,838,476 | Cowell | Dec. 29, 1931 |
| 2,554,061 | Sandberg | May 22, 1951 |